L. T. MATHEWS.
REGISTER AND CHANGE RETURNER.
APPLICATION FILED APR. 25, 1910.

1,052,494.

Patented Feb. 11, 1913.
8 SHEETS—SHEET 1.

UNITED STATES PATENT OFFICE.

LOUIS T. MATHEWS, OF SAN ANTONIO, TEXAS, ASSIGNOR TO S. D. MATHEWS, OF FORT WORTH, TEXAS.

REGISTER AND CHANGE-RETURNER.

1,052,494.  Specification of Letters Patent.  Patented Feb. 11, 1913.

Application filed April 25, 1910. Serial No. 557,424.

*To all whom it may concern:*

Be it known that I, LOUIS T. MATHEWS, a citizen of the United States, residing at San Antonio, in the county of Bexar and State of Texas, have invented certain new and useful Improvements in Registers and Change-Returners, of which the following is a specification.

My invention relates to a money operating machine, and the object is to provide a machine for the use of street cars, toll gates, shows, and any place where a fixed fare is collected for entrance or purchase, which will register accurately every fare which is deposited or paid in, and by which the exact change can be mechanically returned when a party has not the exact fare or price to be deposited.

Another object is to provide a machine which will absolutely protect the owner against theft of money and which will prevent inaccuracies in making change, and which will save time in collecting fares and making change. If the attendant should fail to push the buttons or levers for registering properly the fares collected, provision is made by which the fares will be automatically registered accurately.

Another object is to provide a machine which can be mechanically or electrically operated.

Other objects and advantages will be fully explained in the following description, and the invention will be more particularly pointed out in the claims.

Reference is had to the accompanying drawings which form a part of this application.

Fig. 7a is a detail view of gearing shown in Fig. 7.

Similar characters of reference are used to indicate the same parts throughout the several views.

Figures 5, 5A, 5B:
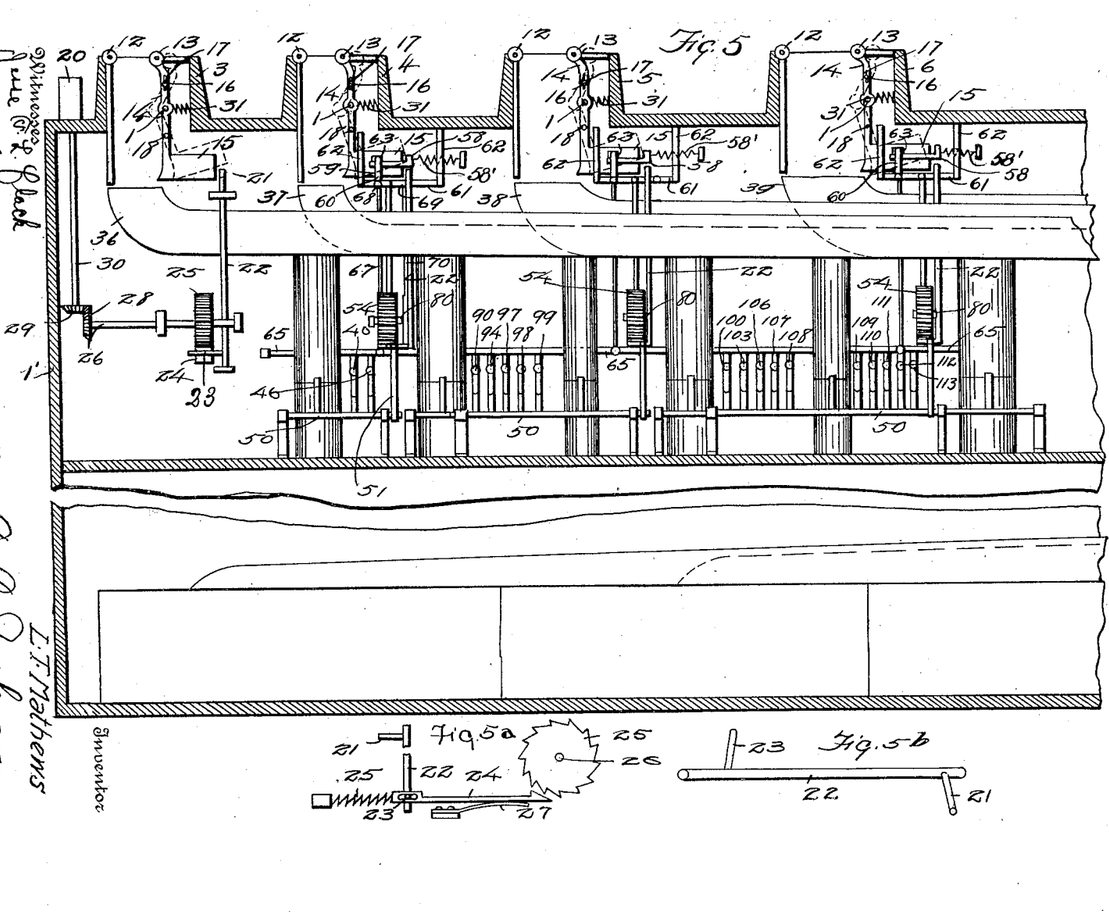
Fig. 5 is a front elevation of the mechanical devices for operating the machine.
Figs. 5a and 5b are detail views of the nickel registering mechanism.
Figure 6:
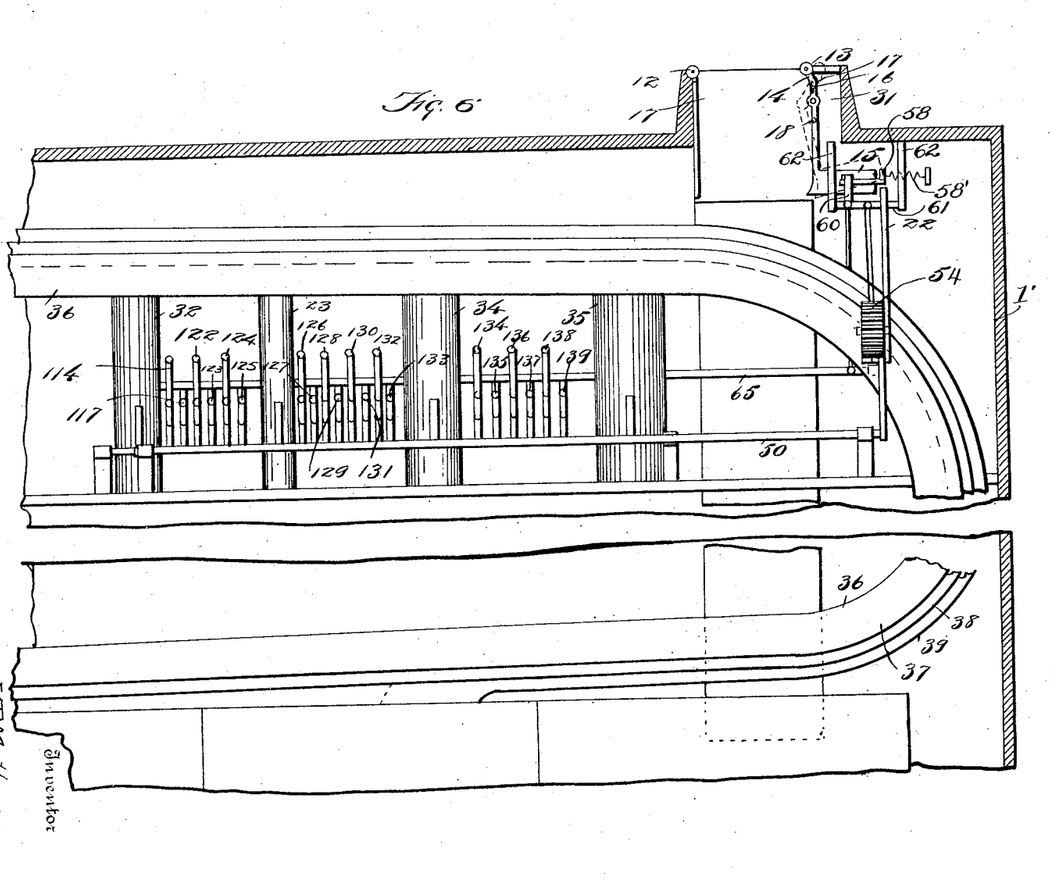
Fig. 6 is a continuation of Fig. 5, the casing being shown in section in Figs. 5 and 6.
Figures 12, 14, 15:
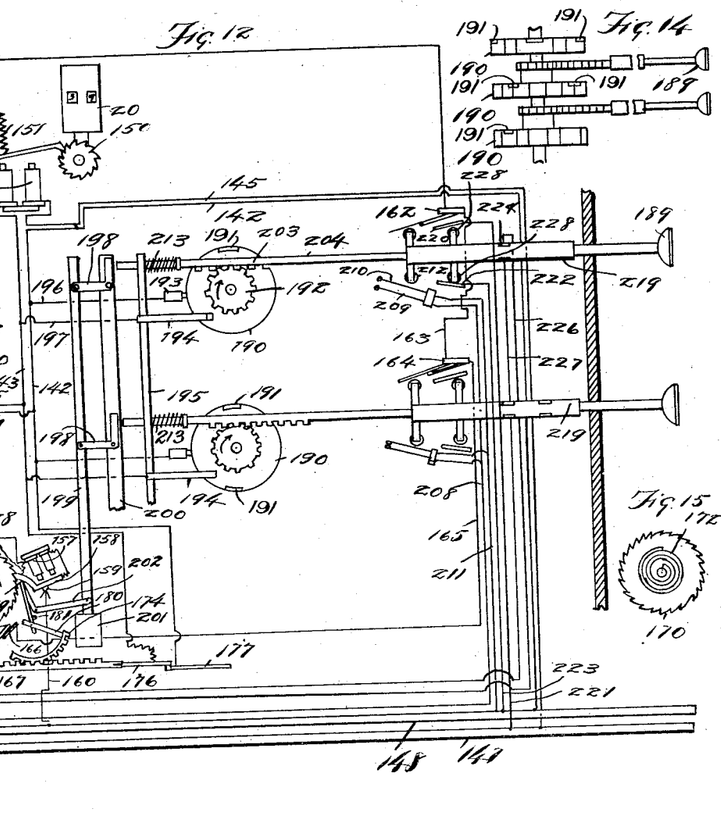
Fig. 12 is a diagrammatical view of electrical devices for operating the machine, this view and the following views, including view 19, showing a variation in the means for operating the machine.
Fig. 14 is a detail view of the register actuating drums.
Fig. 15 is a detail view of one of the wheels used in the automatic registering devices.
Figures 12A, 13:
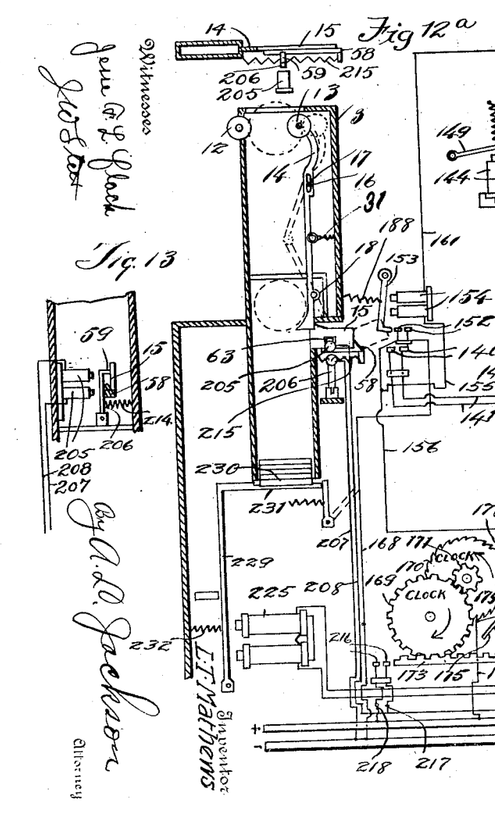
Fig. 12a is a detail plan view of the actuator and its lock.
Fig. 13 is a detail view of the devices for locking and unlocking the receiving chute.

The machine is provided with a casing 1'. Coin receiving chutes 3, 4, 5, 6 and 7 are provided. Trays 8, 9, 10 and 11 are for the customer and the change is mechanically placed in the trays. The chutes 3, 4, 5, 6 and 7 are respectively for the nickel, dime, quarter dollar, half dollar, and dollar. A registering mechanism is provided for each class of coins, that is, one mechanism registers all fares for each class of coins, but separate mechanism is provided for making change for each different class of coins above the nickel in value. Automatic mechanism is provided for registering fares if the attendant fails to register the fares where coins above the nickel in value are placed in the machine. Provisions made in each coin receiving chute for registering one fare. An antifriction roller 12 is journaled in fixed bearings in one side of each chute. Another antifriction roller 13 is mounted opposite the roller 12 in a lever 14 which is fulcrumed in the chute. The lever 14 actuates a locking-actuator 15. The lever 14 is fulcrumed on a pin 1 and the lever 14 has an elongated opening 17 for the pin 16. This is necessary because the lever 14 is pivotally connected to the actuator 15 which is pivotally mounted on a pivot hole 18. A spring 31 holds the actuator 15 and the lever 14 in normal positions, and will bring the actuator back to normal position after each operation. When a coin is forced or pressed into the chute, the lever 14 with its roller 13 will be forced to the position shown by dotted lines in Figs. 5, 6 and 12. There is a register 20 for each denomination of coins. When a coin is inserted, the actuator 15 engages an arm 21 on a vertically disposed rocker shaft 22. The shaft 22 carries a lug or arm 23 which engages a hook 24 in a slot therein. The hook 24 moves the ratchet wheel 25 a step at a time when actuated by the arm 23. A spring 25' will force the hook 24 into position to engage a tooth of the ratchet wheel 25. The ratchet wheel 25 drives a shaft 26. A spring 27 holds the hook 24 in engagement with the wheel 25. The shaft 26 by means of bevel gear wheels 28 and 29 and shaft 30 operates the register 20 which may be of any suitable design, such as are on the market. After the insertion of a coin, the lever 14 is brought back to normal position by a spring 31. This completes the description for registering the coin of the lowest value. The coin receiving chutes for all the coins of larger denomination are similar to the mechanism already described and all chutes and registers are provided with similar mechanism for operating the same. Attention is called to the fact that each of the chutes with its register and mechanism for operating the same will always operate to register one fare regardless of the value of the coin. Each chute for coins of greater value than the nickel is provided with additional mechanism, as hereinafter explained, for registering more than one fare and making change.

When a dime is inserted in chute 4, one fare is registered in the same manner as one fare was registered when a nickel was placed in chute 3, and registered by similar mechanism. In addition to this operation, change must be returned to the passenger if only one fare is to be paid. The nickels are received in tills 32, the dimes in tills 33, the quarters in tills 34, and the half dollars in tills 35. The nickels reach the several nickel tills by means of a chute or race 36. The dimes reach the several tills 33 by a chute or race 37. The quarters reach the tills 34 by a chute or race 38, and the half dollars reach the tills 35 by a chute or race 39. These various chutes or races run over the tops of the tills and drop in the tills until they are full and then to and in the next till until it is full and so on until all the tills are full and then fall in boxes for each denomination of coins separately. When the dime is placed in chute 4, a nickel must be returned to the passenger if there is only one passenger. This is done by pushing a button 40 which operates a rod 41. The rod 41 carries a depending lug 42. A rocker shaft 43 carries an upstanding rigid lug 44 which is actuated by lug 42 and which actuates a slide 45. This will eject a nickel from the till 32. If a dime is placed in the chute 14 for two passengers, one fare will be registered as above described and the attendant must push a button to register another fare. A button 46 is carried by a push rod 47 which carries a lug 48. Lug 48 actuates a lug 49 which is rigid with rocker shaft 50. This operation rocks the shaft 50. A lug 51 is rigid with shaft 50. When shaft 50 is rocked the lug 51 actuates the bar 52 which has a rack 53 integral therewith. The rack 53 actuates a gear wheel 54. The wheel 54 by means of bevel gear wheels 55 and 56 and shaft 57 operates the register 20. If the attendant fails to push the button to register the second fare, means are provided for automatically registering the second fare. The attendant might want to appropriate the second fare for his own use. One of the objects of this invention is to prevent the possibility of such theft. When a dime is inserted in chute 4 and pressed down between the rollers 12 and 13, the actuator 15 moves to the position of the dotted outline. This will push the guard 58 out of engagement with the lock 59. The lock 59 is carried by an arm 60 which is rigid with a rocker shaft 61 which is journaled in hangers 62. When the actuator reaches the position of the dotted outline, the lock 59 falls against the surface of the actuator. See Figs 5 and 6, 7 and 8, and 12$^a$. As soon as the fare is registered the actuator goes back to normal position and the lock 59 falls into recess 63 in the actuator. This prevents any more coins being inserted in the coin receiving chute until the guard 58 has been replaced into normal position. The guard 58 is restored to normal position by a compression spring 58'. If change is to be returned to the passenger, the attendant pushes a button 46 and unlocks the actuator in the following manner:—The rod 47 moves a lug 64 which is rigid with a rocker shaft 65. This operates the lug 66 which is rigid with shaft 65. A link bar 67 is pivotally connected to the lug 66 and lug 68. Thus a push on rod 47 will release the actuator 15 by drawing lock 59 out of the actuator. Guard 58 will hold lock 59 out of engagement with the actuator, so that another coin may be inserted in the chute 4, the roller 13 having come back to normal position as the actuator came back to normal position. If the attendant fails to push the button 40 when no change is to be returned and thus fails to register all the fares paid for, the fares will be registered automatically by what may be called a time element. When the coin is inserted, the actuator 15 moves the guard 58. This allows lock 59 to fall against the surface of the actuator 15 ready to fall into recess 63 when actuator 15 comes to normal position. This operation at the same time rocks shaft 61 and thus operates the lug 69 which has a depending arm 70.

71 indicates a clock or time mechanism. The arm 70 normally locks the time mechanism against movement by engaging a cog wheel 70′ of the time mechanism. When a coin is inserted, the last mentioned operations are effected and the arm 70 releases the time mechanism which commences to run. This mechanism moves the rack 72 far enough to engage the rack 53. For the dime chute the rack 72 is made just long enough to move the rack 53 to turn the wheel 54 enough to register one fare. This latter mechanism is used only in case the attendant fails to register the correct fares. If the attendant does register the correct fares, the time mechanism operates, but does not register anything. The reason why the time mechanism does not register in this case is because when the attendant pushes button 46, the shaft 65 is rocked. Shaft 65 carries an L-lug 73 which carries a roller 74. When the attendant rocks the shaft 65, the roller 74 will depress the rack 72 and thus out of engagement with the time mechanism and a tension spring 75 will bring the rack 72 back to normal position before the rack can reach the wheel 54 (which does the registering). At the same time the arm 70 locks the time mechanism. A spring 79 which is mounted in a socket 79′ holds the rack 72 and restores rack 72 to normal position. The manner in which the chute is restored to receive a coin when the attendant registers the fares is described above. The time mechanism will restore the chute to operative condition in the following manner:—After the time mechanism registers a fare as above described the rack 72 is drawn to normal position by the spring 75 and in going back to normal position engages a lug or hook 76 which is integral with rack 72 and engages a hook 77. The hook 77 is pivotally connected to a link bar 78 which is pivotally connected with the arm 69. When the lug 76 pulls on the hook 77, the arm 69 will be pulled down and thus unlock the locking lug 59 and thus let the guard 58 go back to normal position, which is holding the lock 59 out of engagement with the actuator 15.

The time elements, the registering elements, the change making elements of the dime mechanism are duplicated in the quarter, half, and dollar mechanism and need not be described in detail.

The wheels 54 are ordinary cog wheels to be operated by ordinary racks. The shafts 80 are for operating the registers and must be turned in only one direction. The wheel 54 is loosely mounted on the shaft 80 and a ratchet wheel 81 is rigid with the shaft 80 and a spring-pressed pawl 82 is mounted on the wheel 54 for locking the wheel 54 to the shaft for driving purposes.

Figures 7, 8, 8A, 9, 10, 11:
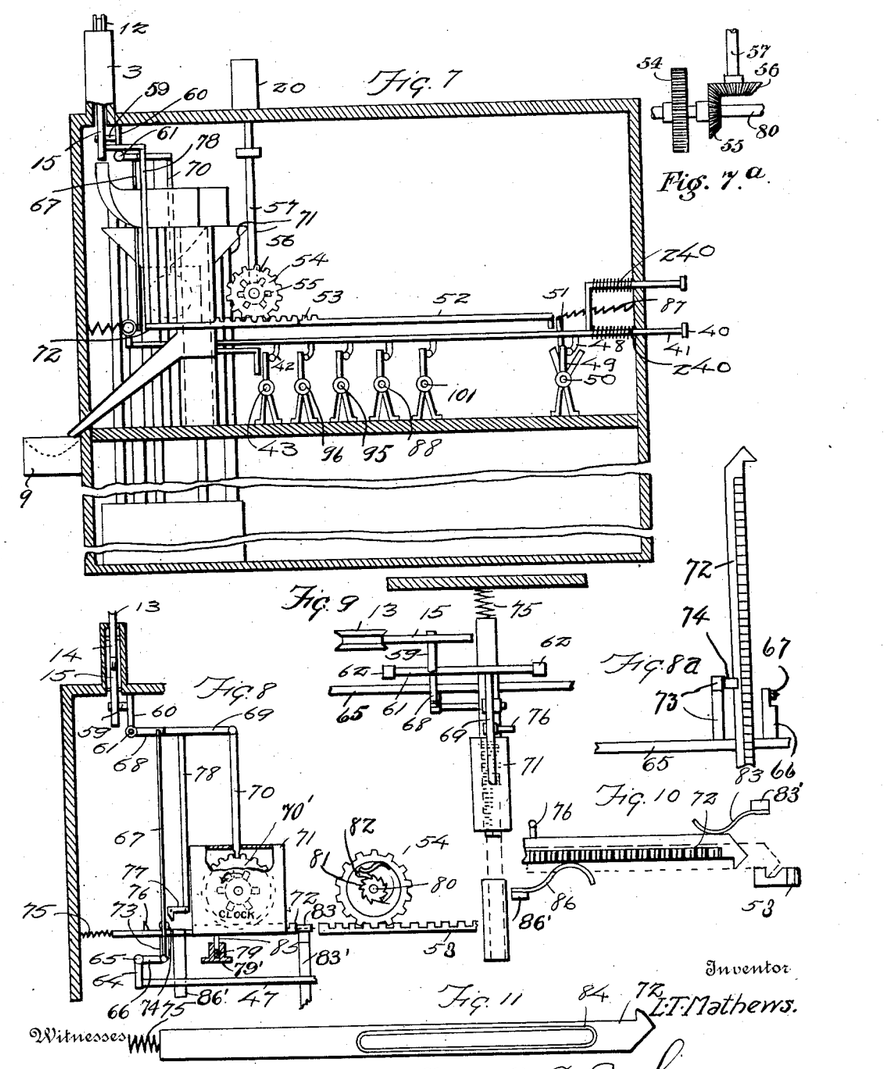
Fig. 7 is an end elevation of the mechanical operating devices.
Fig. 8 is a detail view of the automatic registering devices.
Fig. 8a is a detail view of the mechanism for preventing operation of the time element.
Fig. 9 is a plan view of the devices shown in Fig. 8.
Fig. 10 is a broken plan of the reciprocating rack-bar of the automatic registering devices.
Fig. 11 is a bottom plan of the same.

If the attendant fails to operate the rack 53 to register fares, the time mechanism 71 will operate the rack 53 by means of the rack 72. As soon as a coin is placed in a chute, the time element commences to operate. If the attendant registers properly he throws the rack 72 out of engagement with the time mechanism by means of the roller 74, and the time element will not operate longer. Means are provided for shifting the rack 72 into and out of engagement with the rack 53. As the rack 72 approaches the rack 53, a spring 83 which is attached to a lug 83′ projecting from the casing 1′ will press on the side of the rack 72 to shift the same as shown in Fig. 10. In addition to this spring, the rack 72 has a race or groove 84 in the lower side and a pin 85 projects into the race 84. The pin 85 rests on the spring 79 and presses in the groove 84 in the bottom of rack 72. By reason of this groove and the pin 85 the rack will change to the position of the dotted outline, as shown in Fig. 10. When the rack performs its function by pulling the rack 53 the required distance, a spring 86 which is attached to a lug 86′ projecting from the casing 1′ will force the rack 72 back to its normal position out of engagement with rack 53 and in engagement with the time mechanism by pressing on the side of the rack 72 and causing the rack to move over pin 85 which follows groove 84. The teeth on the rack 72 do not extend entirely across the bar. For this reason the rack 72 will pass back to normal position without engaging the time mechanism. The spring 75 pulls both racks 72 and 53 for registering purposes. A spring 87 will restore the rack 53 to its normal position, the wheel 54 turning loosely on shaft 80 while the rack 53 is moving back to normal position.

Figure 1:
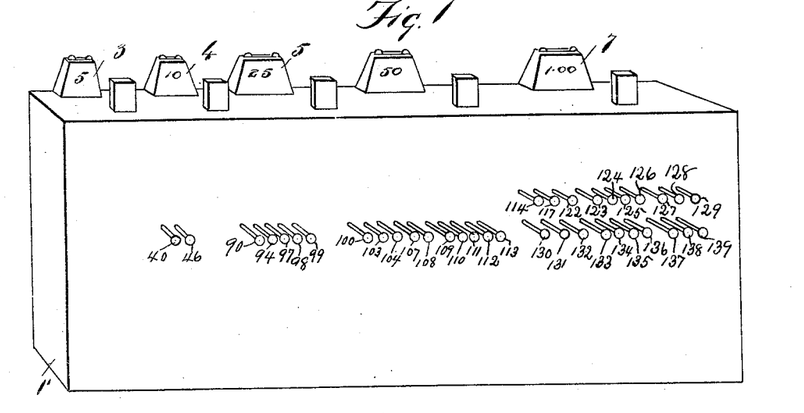
Figure 1 is a perspective view of the machine, showing the side which faces the attendant.
Figure 2:
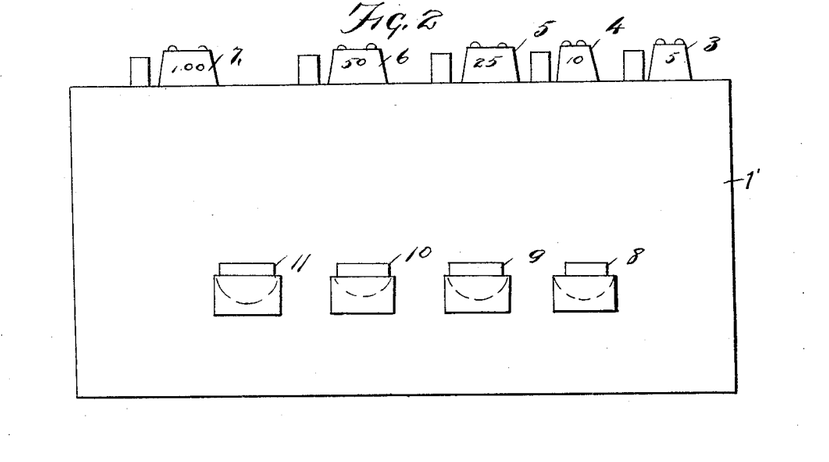
Fig. 2 is a front elevation of the machine, or the side which faces the customer.
Figure 3:
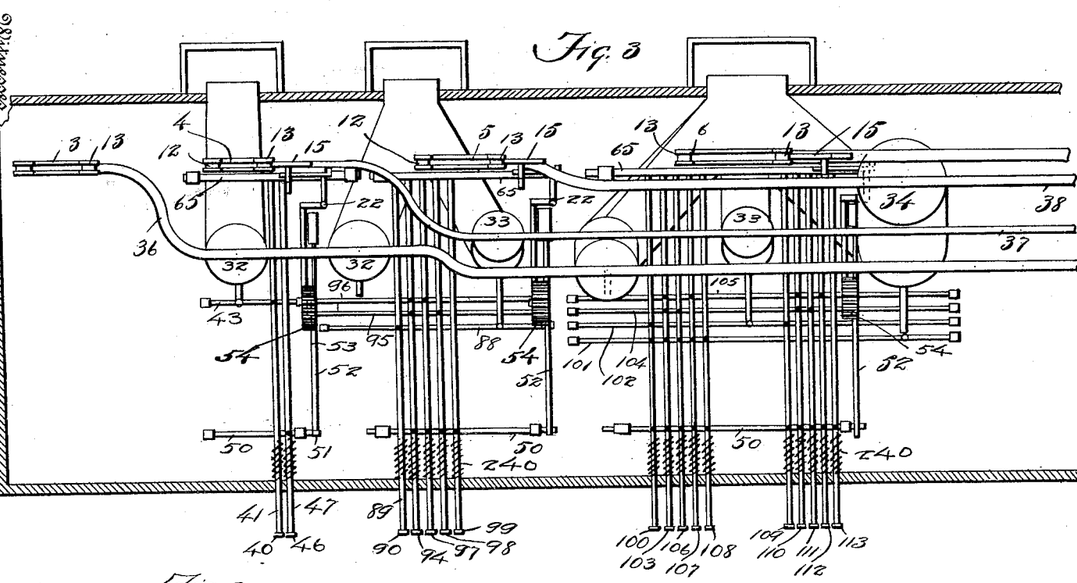
Fig. 3 is a plan view of the operating mechanism, showing in detail the mechanical devices for operating the machine.
Figure 3A:
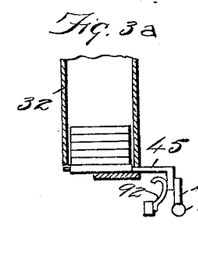
Figs. 3a and 3b are detail views of coin tills.
Figure 3B:
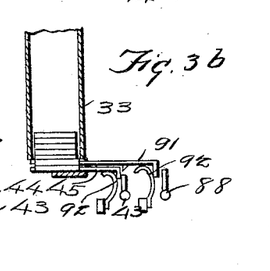
Figure 4:
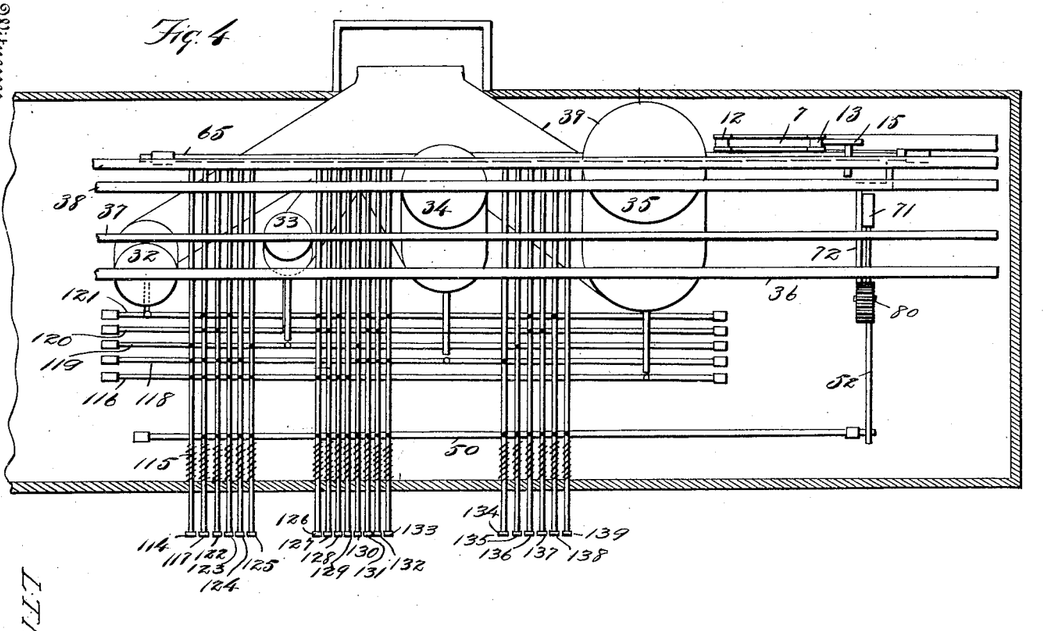
Fig. 4 is a continuation of Fig. 3.

For convenience in locating the connection of each push rod with the shaft which it operates, the connection is indicated in solid black at the crossing of the push rod and the rocker shaft in Figs. 3 and 4. Lugs similar to lug 49 are rigid with the shafts 88, 95, 96, 101, 102, 104, 105, 116, 118, 119, 120, and 121. When a dime is inserted to pay one fare, one fare is registered automatically, as heretofore explained. The operator pushes button 40 to rock shaft 43 to give back a nickel in change. At the same time the rod 41 operates shaft 65 to unlock the actuator 15 so that another coin can be inserted in the chute 4. If a dime is put in to pay two fares, one fare is registered automatically, and the operator pushes button 46 to operate shaft 50 to register another fare and at the same time operates shaft 65 to unlock actuator 15. If a quarter is placed in chute 5 to pay one fare, push button 90 to operate shaft 88 to discharge two dimes from till 33 for change. At the same time rod 89 operates shaft 65 to unlock the actuator 15. When two dimes are to be given in change, a slide 91 ejects one dime and actuates the slide 45 to eject a second dime. The slides 45 and 91 are restored to normal positions by springs 92. If a quarter is placed in chute to pay two fares, push button 94 to operate shaft 50 to register another fare, one fare being registered automatically, and to operate shaft 95 to eject a nickel and shaft 96 to eject a dime. At the same time shaft 65 is operated to unlock the actuator 15. If three fares are to be paid, push button 97 to operate shaft 50 to register two more fares and to operate shaft 96 to give a dime in change and operates shaft 65 to unlock actuator 15. If four fares are to be paid, push button 98 to operate shaft 50 to register three fares and to operate shaft 95 to give a nickel in change and to operate shaft 65 to unlock actuator 15. If five fares are to be paid, push button 99 to operate shaft 50 to register four fares and to operate shaft 65 to unlock actuator 15. Springs 240 bring the push buttons back to normal positions. The lugs 49 which are carried by the rocker shaft 50 must be set at different angles for the quarter, half, and dollar series, because the shaft 50 will have to be turned more for registering a greater number of fares. The lugs 49 must be set at different positions axially on the shaft 50. If a half dollar is placed in the chute 6 to pay one fare, push button 100 to operate shaft 101 to eject a quarter from till 34 and to operate shaft 102 to eject two dimes from till 33. At the same time the shaft 65 is operated to unlock the actuator 15. To pay two fares, push button 103 to operate shaft 50 to register one fare, shaft 101 to eject a quarter from till 34, shaft 104 to eject a dime from till 33, shaft 105 to eject a nickel from till 32, and shaft 65 to unlock actuator 15. To pay three fares, push button 106 to operate shaft 50 to register two fares, shaft 101 to eject a quarter, shaft 104 to eject a dime, and shaft 65 to unlock actuator. To pay four fares, push button 107 to operate shaft 50 to register three fares, shaft 101 to eject a quarter from till 34, shaft 105 to eject a nickel, and shaft 65 to unlock actuator 15. To pay five fares, push button 108 to operate shaft 50 to register four fares, shaft 101 to eject a quarter, and shaft 65 to unlock actuator 15. To pay six fares, push button 109 to operate shaft 50 to register five fares, shaft 102 to eject two dimes, and shaft 65 to unlock actuator 15. To pay seven fares, push button 110 to operate shaft 50 to register six fares, shaft 104 to eject a dime, shaft 105 to eject a nickel, and shaft 65 to unlock actuator. To pay eight fares, push button 111 to operate shaft 50 to register seven fares, shaft 104 to eject a dime, and shaft 65 to unlock actuator. To pay nine fares, push button 112 to operate shaft 50 to register eight fares, shaft 105 to eject a nickel, and shaft 65 to unlock actuator. To pay ten fares, push button 113 to operate shaft 50 to register nine fares and shaft 65 to unlock actuator 15.

The dollar mechanism is shown in Fig. 4, which is a continuation of Fig. 3. If a dollar is inserted in chute 7 to pay one fare, push button 114, as one fare is registered automatically by the insertion of the coin, no registering is to be effected by the rod 115. When the button 114 is pushed shaft 116 is operated to eject a half dollar from till 35, shaft 118 to eject a quarter from till 34, and shaft 119 to eject two dimes from till 33, and shaft 65 is operated to unlock the actuator 15. It must be remembered that whenever a coin is inserted in a chute, the time element 71 is started or thrown into operation and would register fares, but that when the attendant pushes the button, he stops the operation of the time element. If two fares are to be paid, push button 117 to operate shaft 50 to register one more fare, to operate shaft 116 to give in change a half dollar from till 35, shaft 118 to eject a quarter from till 34, shaft 120 to eject a dime from till 33, and shaft 121 to eject a nickel from till 32, and shaft 65 is operated to unlock the actuator 15. If three fares are to be paid, push button 122 to operate shaft 50 to register two more fares, shaft 116 to eject a half dollar, shaft 118 to eject a quarter, shaft 120 to eject a dime, and shaft 65 to unlock the actuator 15. If four fares are to be paid, push button 123 to operate shaft 50 to register three more fares, shaft 116 to eject a half dollar, shaft 118 to eject a quarter, shaft 121 to eject a nickel, and shaft 65 to unlock the actuator. If five fares are to be paid, push button 124 to register four more fares by rocking shaft 50, to operate shaft 116 to eject a half dollar, shaft 118 to eject a quarter, and shaft 65 to unlock actuator 15. If six fares are to be paid, push button 125 to operate shaft 50 to register five more fares, shaft 116 to eject a half dollar, shaft 119 to eject two dimes, and shaft 65 to unlock actuator 15. If seven fares are to be paid, push button 126 to operate shaft 50 to register six more fares, shaft 116 to eject a half dollar, shaft 120 to eject a dime, shaft 121 to eject a nickel, and shaft 65 to unlock the actuator 15. If eight fares are to be paid, push button 127 to operate shaft 50 to register seven more fares, shaft 116 to eject a half dollar, shaft 120 to eject a dime, and shaft 65 to unlock the actuator 15. If nine fares are to be paid, push button 128 to operate shaft 50 to register eight fares, shaft 116 to eject a half dollar, shaft 121 to eject a nickel, and shaft 65 to unlock actuator 15. If ten fares are to be paid, push button 129 to operate shaft 50 to register nine fares, shaft 116 to eject a half dollar, and shaft 65 to unlock actuator 15. If eleven fares are to be paid, push button 130 to operate shaft 50 to register ten fares, shaft 118 to eject a quarter, shaft 119 to eject two dimes, and shaft 65 to unlock actuator 15. If twelve fares are to be paid, push button 131. This will operate the same as button 117 except shaft 116. Button 132 will operate the same as button 122 except shaft 116. Button 133 will operate the same as button 123 except shaft 116. Button 134 will operate the same as button 124 except shaft 116. Button 135 will operate the same as button 125 except shaft 116. Button 136 will operate the same as button 126 except shaft 116. Button 137 will operate the same as button 127 except shaft 116. Button 138 will operate the same as button 128 except shaft 116. Button 139 will operate the shaft 50 to register nineteen fares. The buttons from 130 up to and including button 139 register one more fare than the previous button.

Figures 16, 17, 18, 19:
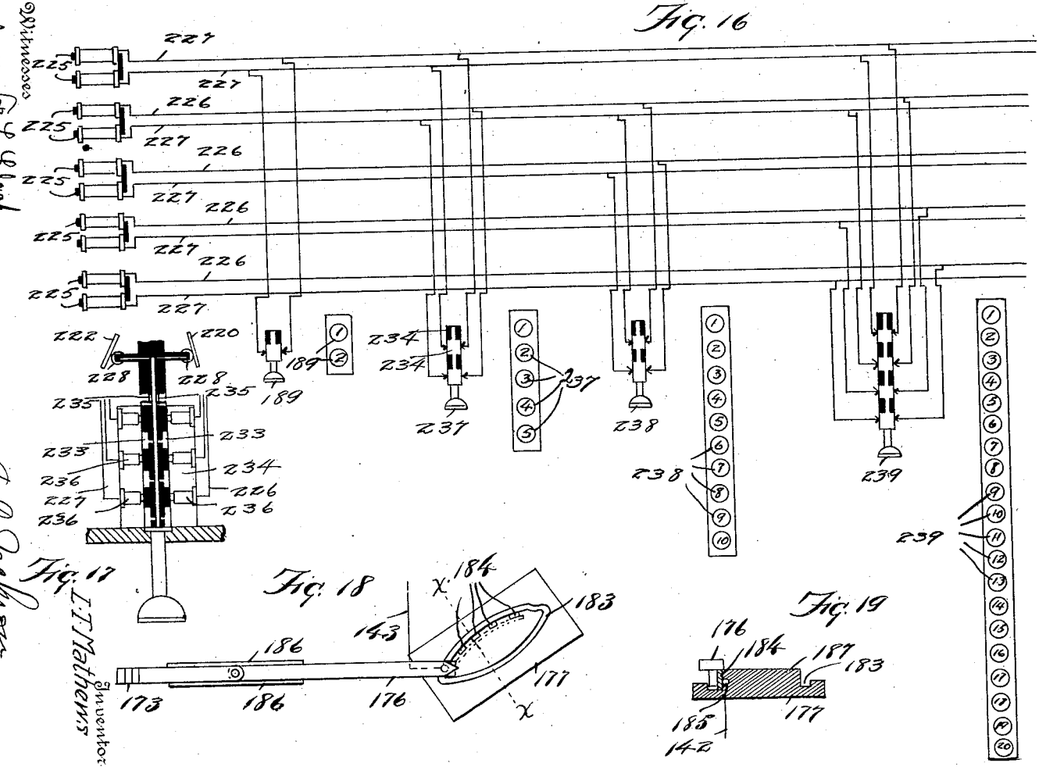
Fig. 16 is a diagrammatic view of the coin ejecting circuits and the keys for actuating the same, the faces of the several keys being shown detached.
Fig. 17 is a detail view of one of the operating keys.
Fig. 18 is a plan view of a part of the automatic registering devices.
Fig. 19 is a vertical section of the devices taken on the line X—X of Fig. 18.

The above description relates to the mechanical devices for registering fares, returning change, and for preventing fraud. The same functions can be performed by electrical devices in part, that is, certain of the above described mechanical devices can be actuated by electrical devices. The electrical devices are shown as variations in Figs. 12 to 19 inclusive. Coins are to be inserted in the chute as before and the coins actuate the actuator 15 in the same way. When a coin is inserted, the actuator 15 is moved to the dotted outline position. This closes the contacts 140 of the circuit including wires 141 which bridge to wires 142 and 143 and sends an impulse to registration coil 144. Coil 144 is energized by wires 145 and 142 which lead respectively from bus bars 147 and 148. This will pull down the armature 149 and actuate the wheel 150 to register a fare. After the fare is registered a spring 151 restores the armature 149 to normal position. A spring 188 restores armature 153 to normal position. At the same time the contacts 152 are closed by the armature 153 which has been moved by the actuator 15. By the closure of the contacts 152 the coil 154 is energized. The coil 154 is in circuit with the bus bars 148 and 149 by means of the wire 155, wire 156, coil 157, armature 158, contact 159, and wire 160 to positive bus bar 148 on one side and by wire 161, contact 162, wire 163, contact 164, and serially through any number of button contacts, then to wire 165, to serial contact 166, and wire 167 to positive bus bar 148. This is feasible because the wire 168 is connected to the negative bus bar 147 and feeds to one of the contacts 152. This starts the time element to operating. The time element consists of the wheels 169 and 170, pinion 171, spring 172 for driving the wheel 170, rack 173 driven by wheel 169, sector 174 driven by rack 173, contact 175, and the make and break contacting devices 176 and 177 for energizing registration coil 144. The insertion of a coin always starts the time element to operating by means of the circuits just described and the time element would register fares unless interrupted as hereinafter explained. When the coil 157 is energized as above described, armature 158 is drawn to the coil 157 and moves the wheel 170 one tooth forward, and this action breaks the contact at 159. A spring 178 will immediately force the dog (which is pivotally connected to the armature 158) to the next tooth of the wheel 170 and the armature will fall back to contact 159. The coil 157 will be immediately reënergized and draw the armature 158 and move the wheel 170 another tooth. This operation will continue until the sector 174 breaks the contact 175. This will also deënergize coil 154 and thus open contact 152. The object in turning wheel 170 is to bring the spring 172 to tension. When the sector 174 breaks the movable contact 175, the sector will also throw the dog 179 out of engagement with wheel 170 (the coil 157 having been deënergized simultaneously with the deënergizing of coil 154) by means of an arm 180 which throws a pivoted dog 181 against the feed dog 179. When this takes place the impulse sender 176 is in position to commence sending impulses to the register coil 144. The impulse sender 176 is carried by the rack 173. Fig. 18 shows the device 176 in position to commence sending impulses. The bar 176 carries a roller brush 182 which runs in a groove 183 in the block of insulation 177 which carries a series of contacts 184 connected together by a rod or wire 185. The contacts 184 represent the fares to be registered. These contacts vary on different blocks 177 according to the number of fares to be registered. The impulse sender 176 is pivotally connected to the rack 173 and springs 186 attached to the rack 173 bear against the sides of the bar 176 and cause this bar to follow the groove 183. The block 177 has a raised elliptical portion 187 and the block is set at angle to the bar 176 so that the roller brush 182 will follow the groove and the raised portion 187. When the spring 172 has been brought to tension as above described, it will drive the wheel 170 and thus drive rack 173. Fig. 18 shows the bar 176 in position to start toward the contacts 184. As the brush 182 passes these contacts impulses will be sent to the coil 144 and thus the fares will be registered. If the attendant does his duty the time element thus described will never operate because a proper pushing of the buttons hereinafter described will prevent the operation of the time element. The time elements will register the fares automatically if the attendant fails to register the fares. The attendant might want to extract a coin without registering the same. He could wait until he reached or neared the end of his beat and then take out the coin. There should be some kind of a partition between the attendant and the coin receptacles so that the attendant cannot have immediate access to the coin tills so that the time element would register the fares before he can go around and make his way to the tills.

Provision is made for the attendant to register the fares and give change. When a coin is placed in the chute 3, the attendant can push a button 189 to register the fare if more than enough was put in the chute to pay one fare. One fare is registered automatically as before described. A disk 190 of insulaion carries contacts 191. Each disk carries a different number of contact makers 191. These vary according to the value of the coin and the change to be returned. A pinion 192 is rigid with the disk 190 and both are loosely mounted on the shaft, an ordinary ratchet wheel and pawl, such as ratchet wheel 81 and pawl 82 shown in Fig. 8, being used to lock the pinion and disk to the shaft for a forward drive. A brush contact 193 is mounted to bear against the periphery of the disk 190. A bar 194 is attached to a post 195 and carries a contact brush against the side of the disk 190. A wire 196 connects brush 193 with the wire 142 and a wire 197 connects the bar 194 with wire 143. Bell crank levers 198 are fulcrumed on a post 200 and pivotally connected with a depressible bar 199 which rests in a dash-pot 201. The bar 199 is pivotally connected to a bell crank lever 202, the short arm of which rests against the dog 179. The insertion of a coin closes the contacts and starts the time element to operating as before described. If more fares are to be registered the attendant pushes on the button 189. This will operate the rack 203 and pinion 192 and close a circuit through brush 193 and bar 194 with wires 196 and 197 to operate the register by sending the proper number of impulses indicated by the contacts on the disk 190. At the same time the time element (which commenced to operate when the coin was inserted) is stopped from operating. The rack bar 204 engages the lever 198 and depresses the bar 199 and throws the dog 179 out of engagement with the wheel 170. This will prevent the time element from operating as before described, as this breaks the circuit which is causing the time element to operate. At the same time the actuator 15 is unlocked by means of a different circuit. When the coin is inserted, the actuator is moved to the position of the dotted outline. When the actuator of the dotted outline. When the lock 59 goes back to normal position, the lock 59 falls into the opening in the actuator and thus locks the chute so that no other coin can be placed in the chute until the actuator is unlocked. The actuator is unlocked by means of a coil 205 which is provided with an armature 206. The coil 205 is connected with the negative bus bar 147 by a wire 207 and connected with the contact 209 by a wire 208. See Figs. 12, 12ᵃ and 13. The coöperating movable contact 210 is connected to the negative bus bar 148 by a wire 211. When the button is pushed the roller 212 closes the circuit by pressing contact 210 against contact 209 and energizes coil 205 which draws the lock 59 out of the actuator 15 so that the actuator will move when a coin is inserted. A spring 213 will restore the button 189 to normal position and thus deënergize the coil 205 and a spring 214 will restore armature 206 to normal position. A guard 58 holds the lock 59 out of the actuator 15 and the guard is brought under or between the armature 206 and the actuator 15 by a spring 215 when the coil 205 draws the lock 59 out of the actuator. The time element will unlock the actuator in the same manner. When the rack 173 reaches its limit it will close the contacts 216 which are connected to the wire 208 by a wire 217 and to the positive bus wire 148 by a wire 218.

Means are provided for returning change. The push rods 219 carry positive and negative contacts. A contact 220 is connected to the negative bus wire by a wire 221. A contact 222 is connected to the positive bus wire 147 by a wire 223. The push rods 189 carry negative contacts 224 on one side and these contacts 224 are connected to one pole of a coil 225 by a wire 226 and the positive contacts are connected to the other pole of coil 225 by a wire 227. When the buttons are pushed the connections are made through the rollers 228 in the manner shown in Figs. 16 and 17. When a contact is made or the circuit is closed the coil 225 draws the armature 229 and ejects a coin 230 which is lying on the arm 231 carried by the armature 229. A spring controlled guard normally prevents a coin from falling from the till. As soon as the coil 225 is deenergized, a spring 232 draws the armature back to normal position. The spring 213 forces the button back to normal position and breaks the circuit. The contacts are made in the push rods.

Fig. 16 shows a complete diagrammatic view of one button of each series of the change making circuits. Fig. 17 illustrates the manner of making connection of one button of each series. Metal contacts 233 are set in the body portion of the push rod which is composed of insulation on the exterior. Two wires or bars 235 run through the push rod and the metal contacts 233 are all connected with the wires 235. Two series of contact brushes 236 are arranged, one on each side of a push rod 189. The brushes are stationary and rest against the surface of the push rod. When the push rod is being pushed the brushes come in contact with the metal contacts 233 before the push rod reaches its limit. Just before the push rod reaches its limit and after contact of brushes has been made with contacts 233 the rollers 228 come in contact with the contact makers 220 and 222, which are permanently connected to the bus bars 147 and 148, the rollers being electrically connected with the wires or rods 235. This closes the circuits. This completes a description of the operation of one push button, including the registering of fares, the changing of money, and the operation and non-operation of the time element. When a nickel is placed in the nickel chute, it simply registers one fare automatically. No push button, no locking element and unlocking element, no time element, and no change making element are necessary. A separate chute is provided for each denomination of coins, that is, a chute for the nickel, a chute for the dime, a chute for the quarter, a chute for the half, and a chute for the dollar. A series of push buttons is provided for each chute and separate change making devices, registering devices, and circuits are provided for each button, except the last button (in a series) which has no change making devices and the first button (in a series) does not register any fare. There is a change making till for each denomination in each series except in the dollar series which has no change making till. It is apparent that it would not be a departure from my invention to provide a series for higher denominations in which dollars would be returned as change.

Fig. 16 shows a diagram of the change making circuits for each series. 189 indicates a series of dime buttons. A dime has been put in to pay one fare. One fare is automatically registered and button No. 1 has been pushed to give a nickel in change. If two fares were to be paid, button No. 2 would register one fare and give back no change. In this series there would be no disk 190 for button No. 1, but there would be a disk 190 with one contact 191 for button No. 2. 237 indicates a series of quarter buttons. Push button No. 1 to give two dimes in change but not to register. Push button No. 2 to give one nickel and one dime in change and to register one fare. Push button No. 3 to give one dime in change and to register two fares. Push button No. 4 to give a nickel in change and to register three fares. Push button No. 5 to give no change but to register four fares. 238 indicates the series of half dollar buttons. Push button No. 1 to give two dimes and one quarter in change and to register nothing. Push button No. 2 to give one nickel, one dime, and a quarter in change and to register one fare. Push button No. 3 to give one dime and one quarter in change and to register two fares. Push button No. 4 to give one nickel and one quarter in change and to register three fares. Push button No. 5 to give one quarter in change and to register four fares. Push button No. 6 to give two dimes in change and to register five fares. Push button No. 7 to give one nickel and one dime in change and to register six fares. Push button No. 8 to give one dime in change and to register seven fares. Push button No. 9 to give one nickel in change and to register eight fares. Push button No. 10 to give no change but to register nine fares. 239 indicates the dollar series of buttons. Push button No. 1 to give a half, a quarter, and two dimes in change and to register nothing. Push button No. 2 to give one half, one quarter, one dime, and one nickel in change and to register one fare. Push button No. 3 to give one half, one quarter, and one dime in change and to register two fares. Push button No. 4 to give one half, one quarter, and one nickel in change and to register three fares. Push button No. 5 to give one half and one quarter in change and to register four fares. Push button No. 6 to give one half and two dimes in change and to register five fares. Push button No. 7 to give one half, one dime, and one nickel in change and to register six fares. Push button No. 8 to give a half and a dime in change and to register seven fares. Push button No. 9 to give one half and one nickel in change and to register eight fares. Push button No. 10 to give one half in change and to register nine fares. Push button No. 11 to give one quarter and two dimes in change and to register ten fares. Push button No. 12 to give one quarter, one dime, and one nickel in change and to register eleven fares. Push button No. 13 to give one quarter and one dime in change and to register twelve fares. Push button No. 14 to give one quarter and one nickel in change and to register thirteen fares. Push-button No. 15 to give one quarter and to register fourteen fares. Push button No. 16 to give two dimes in change and to register fifteen fares. Push button No. 17 to give one dime and one nickel in change and to register sixteen fares. Push button No. 18 to give one dime in change and to register seventeen fares. Push button No. 19 to give one nickel in change and to register eighteen fares. Push button No. 20 to give no change but to register nineteen fares.

Each register except the nickel register is provided with a series of push buttons and a series of change holding tills and these elements are independently operative so that an attendant can register the fares and make change for the several people without having to wait for each person to take up the change.

It is apparent that much time can be saved and accuracy secured and fraud prevented with this machine.

Having fully described my invention, what I claim as new and desire to secure by Letters Patent, is,—

1. A register and change returning machine comprising a register, a receiving chute, means operatively connected with the said receiving chute and with said register for automatic operation of said register, a series of push buttons for further operation of said register, and means operatively connected with said chute and with said register for operation of said register when the operator fails to register the fares.

2. A register and change returning machine comprising a register, a receiving chute, means operatively connected with chute, means operatively connected with said receiving chute and with said register for automatic operation of said register, and a timing element operatively connected with said chute and with said register for further automatic operation of said register.

3. A registering and change returning machine comprising a register, a receiving chute, means operatively connected with said receiving chute and with said register for automatic operation of said register, a series of push buttons, a series of coin ejecting tills, means connecting said push buttons with said register and means connecting said buttons with said tills whereby said register is operated and whereby change is delivered simultaneously with the operation of said register.

4. A registering and change returning machine comprising a register, a receiving chute having a movable member, an actuator operatively connected with said chute, means automatically locking the actuator after insertion of a coin, means operatively connected with said register and with said actuator for automatic operation of said register, a series of push buttons, and means operatively connecting said actuator with said push buttons whereby said push buttons unlock said actuator whereby the movable member of said chute is restored to normal position to receive another coin.

5. A registering and change returning machine comprising a register, a receiving chute, an actuator operatively connected with said chute, means automatically locking the actuator after insertion of a coin, means operatively connected with said register and with said actuator for automatic operation of said register, a series of push buttons operatively connected with said register for further operation of said register and operatively connected with said actuator for unlocking the same.

6. A registering and change returning machine comprising a register, a receiving chute having a movable member, an actuator operatively connected with said chute, means operatively connected with said register and operatively connected with said actuator for automatic operation of said register, and a time element operatively connected with said actuator for unlocking the same whereby the movable member of said chute is restored to normal position to receive another coin.

7. A registering and change making machine comprising a register, a receiving chute, an actuator operatively connected with said chute, means automatically locking the actuator after insertion of a coin, means operatively connected with said register and with said actuator for automatic operation of said register, a time element operatively connected with said register for further operation of said register, and means operatively connecting said time element with said actuator for unlocking the same.

8. A registering and change making machine comprising a register, a receiving chute, an actuator, means for locking the actuator to prevent insertion of a second coin before the first coin is disposed of, a series of push buttons operatively connected with said register for operating the same and operatively connected with said actuator for unlocking the same.

9. A registering and change making machine comprising a register, a receiving chute, an actuator operatively connected with said chute, means for locking the actuator to prevent insertion of a second coin before the first coin is disposed of, a time element operatively connected with said register for operating the same, and means operatively connecting said time element with said actuator for unlocking the same.

10. A registering and change making machine comprising a register, a receiving chute, an actuator operatively connected with said chute, means for locking the actuator to prevent insertion of a second coin before the first coin is disposed of, means operatively connecting said actuator with said register for automatic operation of the register, a series of push buttons operatively connected with said register for further operation of said register, and a time element operatively connected with said register for operating the same if the said push buttons are not operated.

11. A registering and change making machine comprising a register, a receiving chute, an actuator operatively connected with said chute, means operatively connecting said actuator with said register for automatic operation of the same, a series of push buttons operatively connected with said register for further operation of the same, and a time element operatively connected with said register for operating the same if said push buttons are not operated.

12. A registering and change making machine comprising a register, a receiving chute, an actuator for transmitting the motion of the coin to the registering mechanism and for locking the chute against the reception of another coin until the registering operation is complete, means for locking the actuator to prevent insertion of a second coin before the first coin is registered, means for holding said actuator unlocked, and a series of push buttons operatively connected with said register for operating the same and operatively connected with said actuator for unlocking the same.

13. A registering and change making machine comprising a register, a receiving chute, an actuator operatively connected with said chute, means operatively connecting said actuator with said register for automatic operation of the same, means for locking said actuator to prevent a second coin from being inserted before the first coin is disposed of, a series of push buttons operatively connected with said register for further operation of the same and operatively connected with said actuator locking means for unlocking the same, and means for holding said actuator unlocked.

14. A registering and change making machine comprising a register, a receiving chute, an actuator operatively connected with said chute and with said register for automatic operation of said register, a series of coin holding tills, and a series of push buttons operatively connected with said register for further operation of the same and operatively connected with said actuator and with said tills whereby said actuator is unlocked and change ejected from said tills simultaneously with the operation of said register.

15. A registering and change making machine comprising a series of coin receiving chutes, a series of registers, (a register with each chute), operative means connecting each chute with its register for automatic operation of the register, a series of independently operative push buttons for further operation of each register, a series of coin holding tills corresponding to each chute, and means connecting said push buttons with said tills whereby change is ejected from said tills simultaneously with the operation of said registers by said push buttons.

16. A registering and change making machine comprising a series of coin chutes for coins of different denominations, a series of registers, means operatively connecting each chute with its corresponding register for automatic operation of the register, a series of independently operative push buttons for each chute, each button being operatively connected with a register for further operation of the register, and a time element operatively connected with each chute and with the corresponding register whereby the register will be further automatically operated if said push buttons are not operated.

17. A registering and change making machine comprising a series of coin receiving chutes for coins of different denominations, a series of registers, means operatively connecting each chute with its corresponding register for automatic operation of the register, a series of coin holding tills with each chute, a series of independently operative buttons operatively connected with each register for further operation of the register and operatively connected with the corresponding coin holding tills for ejecting change, simultaneously ejecting change with the operation of the register, a time element operatively connected with each register for further operation of the register if the push buttons are not operated, and means connecting said buttons with said time element whereby said buttons prevent the operation of the time element.

In testimony whereof, I set my hand in the presence of two witnesses, this 21st day of April, 1910.

LOUIS T. MATHEWS.

Witnesses:
A. L. JACKSON,
JESSE F. L. SLACK.

Copies of this patent may be obtained for five cents each, by addressing the "Commissioner of Patents, Washington, D. C."